(12) United States Patent
Rosti et al.

(10) Patent No.: US 10,606,587 B2
(45) Date of Patent: Mar. 31, 2020

(54) APPARATUS AND METHODS RELATED TO MICROCODE INSTRUCTIONS INDICATING INSTRUCTION TYPES

(71) Applicant: Micron Technology, Inc., Boise, ID (US)

(72) Inventors: Shawn Rosti, Eagle, ID (US); Timothy P. Finkbeiner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 107 days.

(21) Appl. No.: 15/245,776

(22) Filed: Aug. 24, 2016

(65) Prior Publication Data

US 2018/0060069 A1 Mar. 1, 2018

(51) Int. Cl.
| G06F 9/30 | (2018.01) |
| G06F 9/26 | (2006.01) |
| G06F 9/22 | (2006.01) |
| G06F 9/28 | (2006.01) |
| G06F 12/0875 | (2016.01) |

(52) U.S. Cl.
CPC .............. G06F 9/261 (2013.01); G06F 9/226 (2013.01); G06F 9/28 (2013.01); G06F 9/30145 (2013.01); G06F 9/30185 (2013.01); G06F 12/0875 (2013.01); G06F 2212/452 (2013.01)

(58) Field of Classification Search
CPC .................................................. G06F 9/30145
See application file for complete search history.

(56) References Cited

U.S. PATENT DOCUMENTS

| 4,380,046 A | 4/1983 | Fung |
| 4,435,792 A | 3/1984 | Bechtolsheim |
| 4,435,793 A | 3/1984 | Ochii |
| 4,727,474 A | 2/1988 | Batcher |
| 4,843,264 A | 6/1989 | Galbraith |

(Continued)

FOREIGN PATENT DOCUMENTS

| CN | 102141905 | 8/2011 |
| EP | 0214718 | 3/1987 |

(Continued)

OTHER PUBLICATIONS

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

(Continued)

Primary Examiner — Jacob Petranek
(74) Attorney, Agent, or Firm — Brooks, Cameron & Huebsch, PLLC

(57) ABSTRACT

The present disclosure includes apparatuses and methods related to microcode instructions. One example apparatus comprises a memory storing a set of microcode instructions. Each microcode instruction of the set can comprise a first field comprising a number of control data units, and a second field comprising a number of type select data units. Each microcode instruction of the set can have a particular instruction type defined by a value of the number of type select data units, and particular functions corresponding to the number of control data units are variable based on the particular instruction type.

30 Claims, 7 Drawing Sheets

(56) References Cited

U.S. PATENT DOCUMENTS

| | | |
|---|---|---|
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffman et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,922,065 A | 7/1999 | Hull et al. |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,185,670 B1 * | 2/2001 | Huff ................. G06F 9/30021 |
| | | 708/209 |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,062,526 B1 * | 6/2006 | Hoyle ................. G06F 7/49947 |
| | | 708/550 |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,873,812 B1 * | 1/2011 | Mimar ................. G06T 1/20 |
| | | 712/2 |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |

(56) References Cited

U.S. PATENT DOCUMENTS

| | | | |
|---|---|---|---|
| 8,873,272 | B2 | 10/2014 | Lee |
| 8,964,496 | B2 | 2/2015 | Manning |
| 8,971,124 | B1 | 3/2015 | Manning |
| 9,015,390 | B2 | 4/2015 | Klein |
| 9,047,193 | B2 | 6/2015 | Lin et al. |
| 9,165,023 | B2 | 10/2015 | Moskovich et al. |
| 2001/0007112 | A1 | 7/2001 | Porterfield |
| 2001/0008492 | A1 | 7/2001 | Higashiho |
| 2001/0010057 | A1 | 7/2001 | Yamada |
| 2001/0028584 | A1 | 10/2001 | Nakayama et al. |
| 2001/0043089 | A1 | 11/2001 | Forbes et al. |
| 2002/0059355 | A1 | 5/2002 | Peleg et al. |
| 2003/0167426 | A1 | 9/2003 | Slobodnik |
| 2003/0222879 | A1 | 12/2003 | Lin et al. |
| 2004/0073592 | A1 | 4/2004 | Kim et al. |
| 2004/0073773 | A1 | 4/2004 | Demjanenko |
| 2004/0085840 | A1 | 5/2004 | Vali et al. |
| 2004/0095826 | A1 | 5/2004 | Perner |
| 2004/0154002 | A1 | 8/2004 | Ball et al. |
| 2004/0193784 | A1 | 9/2004 | Kirsch |
| 2004/0205289 | A1 | 10/2004 | Srinivasan |
| 2004/0240251 | A1 | 12/2004 | Nozawa et al. |
| 2005/0015557 | A1 | 1/2005 | Wang et al. |
| 2005/0055535 | A1* | 3/2005 | Moyer ............... G06F 9/30043 712/4 |
| 2005/0078514 | A1 | 4/2005 | Scheuerlein et al. |
| 2005/0097417 | A1 | 5/2005 | Agrawal et al. |
| 2005/0278504 | A1* | 12/2005 | Huang ............... G06F 9/3877 712/34 |
| 2006/0047937 | A1 | 3/2006 | Selvaggi et al. |
| 2006/0069849 | A1 | 3/2006 | Rudelic |
| 2006/0146623 | A1 | 7/2006 | Mizuno et al. |
| 2006/0149804 | A1 | 7/2006 | Luick et al. |
| 2006/0181917 | A1 | 8/2006 | Kang et al. |
| 2006/0215432 | A1 | 9/2006 | Wickeraad et al. |
| 2006/0225072 | A1 | 10/2006 | Lari et al. |
| 2006/0291282 | A1 | 12/2006 | Liu et al. |
| 2007/0103986 | A1 | 5/2007 | Chen |
| 2007/0150671 | A1 | 6/2007 | Kurland |
| 2007/0171747 | A1 | 7/2007 | Hunter et al. |
| 2007/0180006 | A1 | 8/2007 | Gyoten et al. |
| 2007/0180184 | A1 | 8/2007 | Sakashita et al. |
| 2007/0195602 | A1 | 8/2007 | Fong et al. |
| 2007/0285131 | A1 | 12/2007 | Sohn |
| 2007/0285979 | A1 | 12/2007 | Turner |
| 2007/0291532 | A1 | 12/2007 | Tsuji |
| 2008/0025073 | A1 | 1/2008 | Arsovski |
| 2008/0037333 | A1 | 2/2008 | Kim et al. |
| 2008/0052711 | A1 | 2/2008 | Forin et al. |
| 2008/0082799 | A1* | 4/2008 | Bloomfield ........ G06F 9/3013 712/226 |
| 2008/0137388 | A1 | 6/2008 | Krishnan et al. |
| 2008/0165601 | A1 | 7/2008 | Matick et al. |
| 2008/0178053 | A1 | 7/2008 | Gorman et al. |
| 2008/0215937 | A1 | 9/2008 | Dreibelbis et al. |
| 2008/0294871 | A1* | 11/2008 | Pappalardo ........ G06F 1/3203 712/22 |
| 2009/0067218 | A1 | 3/2009 | Graber |
| 2009/0154238 | A1 | 6/2009 | Lee |
| 2009/0154273 | A1 | 6/2009 | Borot et al. |
| 2009/0254697 | A1 | 10/2009 | Akerib |
| 2010/0067296 | A1 | 3/2010 | Li |
| 2010/0091582 | A1 | 4/2010 | Vali et al. |
| 2010/0172190 | A1 | 7/2010 | Lavi et al. |
| 2010/0210076 | A1 | 8/2010 | Gruber et al. |
| 2010/0226183 | A1 | 9/2010 | Kim |
| 2010/0308858 | A1 | 12/2010 | Noda et al. |
| 2010/0332895 | A1 | 12/2010 | Billing |
| 2011/0051523 | A1 | 3/2011 | Manabe et al. |
| 2011/0063919 | A1 | 3/2011 | Chandrasekhar et al. |
| 2011/0093662 | A1 | 4/2011 | Walker et al. |
| 2011/0103151 | A1 | 5/2011 | Kim et al. |
| 2011/0119467 | A1 | 5/2011 | Cadambi et al. |
| 2011/0122695 | A1 | 5/2011 | Li et al. |
| 2011/0140741 | A1 | 6/2011 | Zerbe et al. |
| 2011/0219260 | A1 | 9/2011 | Nobunaga et al. |
| 2011/0267883 | A1 | 11/2011 | Lee et al. |
| 2011/0317496 | A1 | 12/2011 | Bunce et al. |
| 2012/0005397 | A1 | 1/2012 | Lim et al. |
| 2012/0017039 | A1 | 1/2012 | Margetts |
| 2012/0023281 | A1 | 1/2012 | Kawasaki et al. |
| 2012/0120705 | A1 | 5/2012 | Mitsubori et al. |
| 2012/0134216 | A1 | 5/2012 | Singh |
| 2012/0134226 | A1 | 5/2012 | Chow |
| 2012/0135225 | A1 | 5/2012 | Chow |
| 2012/0140540 | A1 | 6/2012 | Agam et al. |
| 2012/0182798 | A1 | 7/2012 | Hosono et al. |
| 2012/0195146 | A1 | 8/2012 | Jun et al. |
| 2012/0198310 | A1 | 8/2012 | Tran et al. |
| 2012/0246380 | A1 | 9/2012 | Akerib et al. |
| 2012/0265964 | A1 | 10/2012 | Murata et al. |
| 2012/0281486 | A1 | 11/2012 | Rao et al. |
| 2012/0303627 | A1 | 11/2012 | Keeton et al. |
| 2013/0003467 | A1 | 1/2013 | Klein |
| 2013/0061006 | A1 | 3/2013 | Hein |
| 2013/0107623 | A1 | 5/2013 | Kavalipurapu et al. |
| 2013/0117541 | A1 | 5/2013 | Choquette et al. |
| 2013/0124783 | A1 | 5/2013 | Yoon et al. |
| 2013/0132702 | A1 | 5/2013 | Patel et al. |
| 2013/0138646 | A1 | 5/2013 | Sirer et al. |
| 2013/0163362 | A1 | 6/2013 | Kim |
| 2013/0173888 | A1 | 7/2013 | Hansen et al. |
| 2013/0198497 | A1* | 8/2013 | Busaba ............... G06F 9/3005 712/233 |
| 2013/0205114 | A1 | 8/2013 | Badam et al. |
| 2013/0219112 | A1 | 8/2013 | Okin et al. |
| 2013/0227361 | A1 | 8/2013 | Bowers et al. |
| 2013/0283122 | A1 | 10/2013 | Anholt et al. |
| 2013/0286705 | A1 | 10/2013 | Grover et al. |
| 2013/0326154 | A1 | 12/2013 | Haswell |
| 2013/0332707 | A1 | 12/2013 | Gueron et al. |
| 2014/0185395 | A1 | 7/2014 | Seo |
| 2014/0215185 | A1 | 7/2014 | Danielsen |
| 2014/0250279 | A1 | 9/2014 | Manning |
| 2014/0344934 | A1 | 11/2014 | Jorgensen |
| 2015/0029798 | A1 | 1/2015 | Manning |
| 2015/0039855 | A1* | 2/2015 | Pechanek ........... G06F 9/3895 712/11 |
| 2015/0042380 | A1 | 2/2015 | Manning |
| 2015/0063052 | A1 | 3/2015 | Manning |
| 2015/0078108 | A1 | 3/2015 | Cowles et al. |
| 2015/0279466 | A1 | 3/2015 | Manning |
| 2015/0120987 | A1 | 4/2015 | Wheeler |
| 2015/0134713 | A1 | 5/2015 | Wheeler |
| 2015/0270015 | A1 | 9/2015 | Murphy et al. |
| 2015/0324290 | A1 | 11/2015 | Leidel |
| 2015/0325272 | A1 | 11/2015 | Murphy |
| 2015/0356009 | A1 | 12/2015 | Wheeler et al. |
| 2015/0356022 | A1 | 12/2015 | Leidel et al. |
| 2015/0357007 | A1 | 12/2015 | Manning et al. |
| 2015/0357008 | A1 | 12/2015 | Manning et al. |
| 2015/0357019 | A1 | 12/2015 | Wheeler et al. |
| 2015/0357020 | A1 | 12/2015 | Manning |
| 2015/0357021 | A1 | 12/2015 | Hush |
| 2015/0357022 | A1 | 12/2015 | Hush |
| 2015/0357023 | A1 | 12/2015 | Hush |
| 2015/0357024 | A1 | 12/2015 | Hush et al. |
| 2015/0357047 | A1 | 12/2015 | Tiwari |
| 2016/0062672 | A1 | 3/2016 | Wheeler |
| 2016/0062673 | A1 | 3/2016 | Tiwari |
| 2016/0062692 | A1 | 3/2016 | Finkbeiner et al. |
| 2016/0062733 | A1 | 3/2016 | Tiwari |
| 2016/0063284 | A1 | 3/2016 | Tiwari |
| 2016/0064045 | A1 | 3/2016 | La Fratta |
| 2016/0064047 | A1 | 3/2016 | Tiwari |
| 2016/0098208 | A1 | 4/2016 | Willcock |
| 2016/0098209 | A1 | 4/2016 | Leidel et al. |
| 2016/0110135 | A1 | 4/2016 | Wheeler et al. |
| 2016/0125919 | A1 | 5/2016 | Hush |
| 2016/0154596 | A1 | 6/2016 | Willcock et al. |
| 2016/0155482 | A1 | 6/2016 | La Fratta |
| 2016/0179514 | A1* | 6/2016 | Oron .................. G06F 9/3001 712/221 |
| 2016/0188250 | A1 | 6/2016 | Wheeler |

(56) References Cited

U.S. PATENT DOCUMENTS

| | | | |
|---|---|---|---|
| 2016/0196142 A1 | 7/2016 | Wheeler et al. | |
| 2016/0196856 A1 | 7/2016 | Tiwari et al. | |
| 2016/0225422 A1 | 8/2016 | Tiwari et al. | |
| 2017/0371739 A1* | 12/2017 | Plondke | G06F 9/30145 |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2008039908 | 4/2008 |
| WO | 2010079451 | 7/2010 |
| WO | 2013062596 | 5/2013 |
| WO | 2013081588 | 6/2013 |
| WO | 2013095592 | 6/2013 |
| WO | 2016126478 | 8/2016 |

OTHER PUBLICATIONS

Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.

Draper, er al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

EP Communication Pursuant to 94(3) EPC for related EP Application No. 17020379.8, dated Feb. 7, 2018, 8 pages.

European Search Report for related EP Application No. 17020379.8, dated Jan. 16, 2018, 4 pages.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

Communication Pursuant to Article 94(3) EPC for related EP Application No. 17020379.8, dated Apr. 2, 2019, 13 pages.

Communication Pursuant to Article 94(3) EPC for related EP Application No. 17020379.8, dated Nov. 27, 2019, 10 pages.

* cited by examiner

| 644 | 645 | | | |
|---|---|---|---|---|
| A | B | NOT OPEN | OPEN TRUE | OPEN INVERT |
| 0 | 0 | 0 | 0 | 1 |
| 0 | 1 | 0 | 1 | 0 |
| 1 | 0 | 1 | 0 | 1 |
| 1 | 1 | 1 | 1 | 0 |

← 6-1

675 ⟶ ⋈⋈

← 6-2

| | | | | | | | | | | |
|---|---|---|---|---|---|---|---|---|---|---|
| FF | 0 | 0 | 0 | 0 | 0 | 0 | 1 | 1 | 1 | ← 676 |
| FT | 0 | 0 | 0 | 1 | 1 | 1 | 0 | 0 | 0 | ← 677 |
| TF | 0 | 0 | 1 | 0 | 0 | 1 | 0 | 0 | 1 | ← 678 |
| TT | 0 | 1 | 0 | 0 | 1 | 0 | 0 | 1 | 0 | ← 679 |
| A | B | A | A*B | A*B̄ | A+B | B | AXB | A+B̄ | $\overline{AXB}$ | $\overline{B}$ |
| 0 | 0 | 0 | 0 | 0 | 0 | 0 | 0 | 1 | 1 | 1 |
| 0 | 1 | 0 | 0 | 0 | 1 | 1 | 1 | 0 | 0 | 0 |
| 1 | 0 | 1 | 0 | 1 | 1 | 0 | 1 | 1 | 0 | 1 |
| 1 | 1 | 1 | 1 | 0 | 1 | 1 | 0 | 1 | 1 | 0 |

APPARATUS AND METHODS RELATED TO MICROCODE INSTRUCTIONS INDICATING INSTRUCTION TYPES

TECHNICAL FIELD

The present disclosure relates generally to semiconductor memory and methods, and more particularly, to apparatuses and methods related to microcode instructions.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions. Executing instructions can involve performance of various operations, which may include the storing of results to a suitable location, for example. The instructions can be in the form of microcode instructions, which can be stored in memory (e.g., Read Only Memory (ROM), RAM, etc.) accessible by a processing resource. A processor can comprise a number of functional units such as arithmetic logic unit (ALU) circuitry, floating point unit (FPU) circuitry, and a combinatorial logic block, for example, which can be used to execute microcode instructions to perform various operations. As an example, each microcode instruction can comprise a number of data units (e.g., bits) used to control various components within a computing system (e.g., ALUs, registers, I/O circuitry, etc.). For example, a microcode instruction may translate higher level machine code into sequences of circuit-level operations. In various instances, a single microcode instruction can specify a number of particular operations. For instance, the bits of a single microcode instruction may indicate a number of settings of an ALU (e.g., whether the ALU's carry input is set to zero, whether the ALU is set for two's complement functions, etc.), update status flags within the ALU, indicate a particular register to which a result is to be stored, may indicate the location of a next microcode instruction, indicate parity for the microcode instruction, and/or may indicate which particular register of a set of registers is to be coupled to the ALU, etc., among various other functions. In this manner, various sequences of a set of microcode instructions can be executed to perform a number of basic operations, which may include, for example, performing operations such as arithmetic operations (e.g., addition, subtraction, multiplication, division, etc.) on data (e.g., operands) via a number of logical operations such as AND, OR, NOT, NAND, NOR, and XOR, and invert (e.g., binary inversion).

The size (e.g., number of bits) of the microcode instructions can vary depending on the particular computing system, for example. For instance, in order for a microcode instruction to control all of the desired functions within a computing system (or particular portion thereof), each microcode instruction can comprise a particular number of control data units (e.g., 90 bits, 108 bits, 160 bits, etc.). As such, microcode instruction size can affect the amount of memory needed to store and/or execute the microcode within a computing system.

BRIEF DESCRIPTION OF THE DRAWINGS

FIG. 6 is a logic table illustrating selectable logic operation results implemented by a sensing circuitry in accordance with a number of embodiments of the present disclosure.

DETAILED DESCRIPTION

Figure 1A:
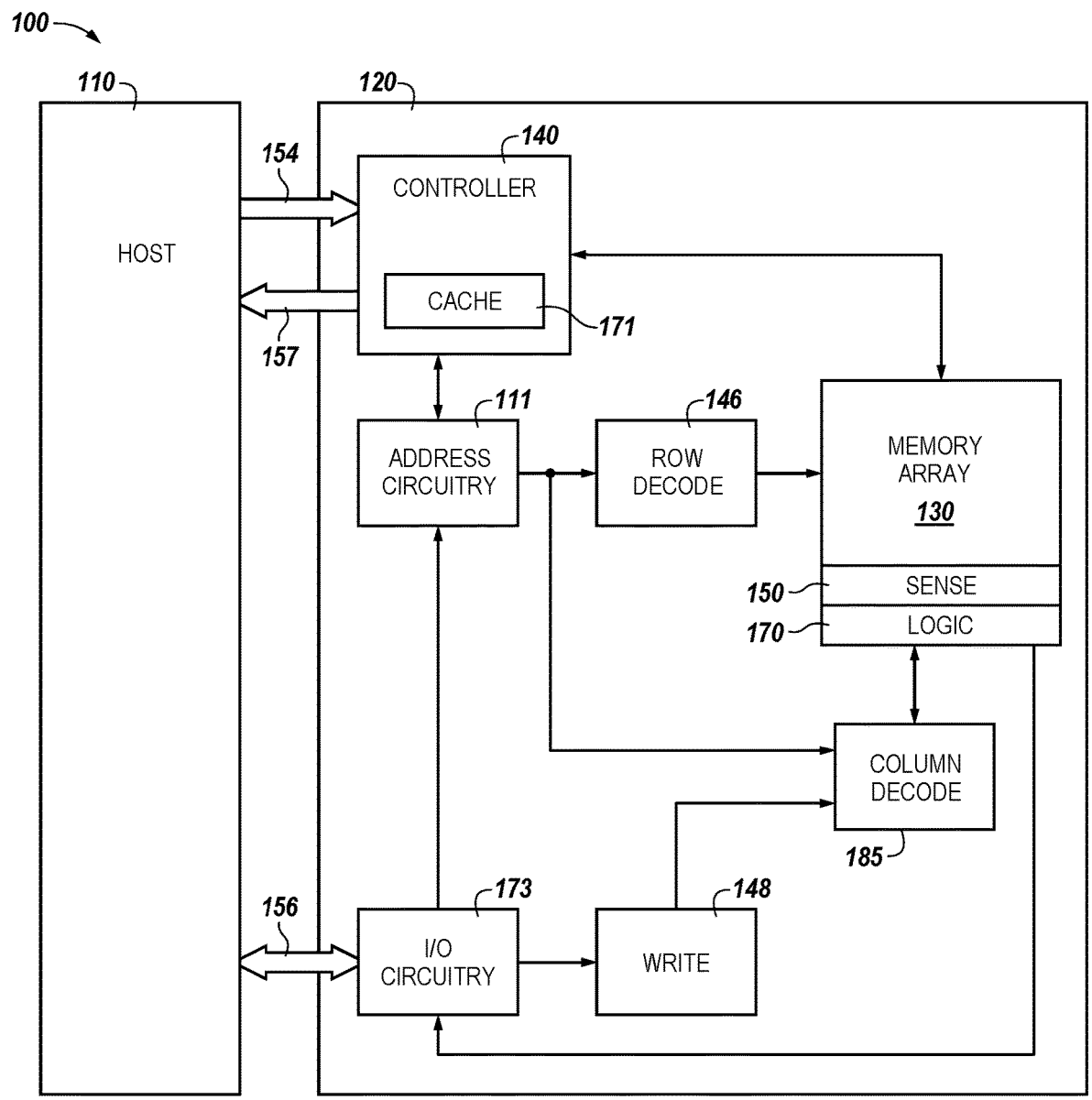
FIG. 1A is a block diagram of an apparatus in the form of a computing system including a memory device in accordance with a number of embodiments of the present disclosure.

The present disclosure includes apparatuses and methods related to microcode instructions. One example apparatus comprises a memory storing a set of microcode instructions. Each microcode instruction of the set can comprise a first field comprising a number of control data units, and a second field comprising a number of type select data units. Each microcode instruction of the set has a particular instruction type indicated by a value of the number of type select data units, and particular functions corresponding to the number of control data units are variable based on the particular instruction type.

Embodiments of the present disclosure can provide benefits such as reducing a size of a single microcode instruction (e.g., a microcode word). As an example, consider a system in which a number of microcode instructions (e.g., a sequence of microcode instructions) are retrieved (e.g., from memory) for execution (e.g., by a processing resource). The memory can often provide limited space to store the number of microcode instructions. A number of embodiments of the present disclosure can provide benefits such as reducing the size (e.g., quantity of data units) of microcode instructions, as compared to previous approaches, without sacrificing the functional capabilities of the microcode instructions, among various other benefits. Reducing the size of microcode instructions, while maintaining functional capability, can provide benefits such as reducing the amount of memory capacity needed to store the microcode and/or can increase the number of microcode instructions storable in a given location (e.g., cache), which may have limited storage capacity.

As described further herein, a number of embodiments include microcode instructions having control data units and type select data units. The control data units can be used to control various functions (e.g., via control signals provided to system components) of a computing system based on their values. The values of the type select data units indicate a particular instruction type corresponding to the microcode instruction. In a number of embodiments, the particular functions controlled by the constituent control data units of a microcode instruction depend on the values of the type select data unit(s) (e.g., on the particular instruction type). For example, if the type select data units of a first microcode instruction have a first value, then a first group of the control data units (e.g., the least significant 8 bits) corresponding to the first microcode instruction might be used to control selection of a particular register. However, if the type select data units of a second (e.g., different) microcode instruction have a different value, then the first group of control data units (e.g., the same least significant 8 bits) corresponding to the second microcode instruction might be used to control one or more different memory functions (e.g., program counter operations rather than register selection).

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, designators such as "N", particularly with respect to reference numerals in the drawings, indicate that a number of the particular feature so designated can be included. As used herein, "a number of" a particular thing refers to one or more of such things (e.g., a number of memory arrays can refer to one or more memory arrays). A "plurality of" a particular thing is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 130 may reference element "30" in FIG. 1, and a similar element may be referenced as 430 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1A is a block diagram of an apparatus in the form of a computing system 100 including a memory device 120 in accordance with a number of embodiments of the present disclosure. As used herein, a memory device 120, controller 140, memory array 130, sensing circuitry 150, logic circuitry 170, and/or cache 171 might also be separately considered an "apparatus."

System 100 includes a host 110 coupled (e.g., connected) to memory device 120, which includes a memory array 130. Host 110 can be a host system such as a personal laptop computer, a desktop computer, a digital camera, a smart phone, or a memory card reader, among various other types of hosts. Host 110 can include a system motherboard and/or backplane and can include a number of processing resources (e.g., one or more processors, microprocessors, etc.). A more detailed diagram of one example of host 110 is described in association with FIG. 1C.

The system 100 can include separate integrated circuits or both the host 110 and the memory device 120 can be on the same integrated circuit. The system 100 can be, for instance, a server system and/or a high performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines, which may be referred to herein as word lines and/or select lines, and columns coupled by sense lines, which may be referred to herein as data lines and/or digit lines. Although a single array 130 is shown in FIG. 1, embodiments are not so limited. For instance, memory device 120 may include a number of arrays 130 (e.g., a number of banks of DRAM cells, NAND flash cells, etc.). Additionally, although not shown, a plurality of memory devices 120 can be coupled to host 110 via a respective plurality of memory channels.

The memory device 120 includes address circuitry 111 to latch address signals provided over a bus 156 through I/O circuitry 173. Bus 156 can serve as a data bus (e.g., an I/O bus) and as an address bus; however, embodiments are not so limited. Status and/or exception information can be provided from the controller 140 on the memory device 120 to host 110 through a high speed interface (HSI), which can include an out-of-band bus 157. Address signals can be received through address circuitry 111 and decoded by a row decoder 146 and a column decoder 185 to access the memory array 130. Data can be read from memory array 130 by sensing voltage and/or current changes on the data lines using sensing circuitry 150. The sensing circuitry 150 can read and latch a page (e.g., row) of data from the memory array 130. The I/O circuitry 173 can be used for bi-directional data communication with host 110 over the data bus 156. The write circuitry 148 can be used to write data to the memory array 130.

Controller 140 decodes signals provided by control bus 154 from the host 110. These signals can include chip enable signals, write enable signals, and address latch signals that are used to control operations performed on the memory array 130, including data read, data write, and data erase operations. In various embodiments, the controller 140 is responsible for executing instructions from the host 110 and sequencing access to the array 130, among other functions. For example, executing instructions from host 110 can include performing operations (e.g., by executing microcode instructions) using processing resources corresponding to the sensing circuitry 150 and/or logic 170, as described further herein. The controller 140 can include a state machine (e.g., firmware and/or hardware in the form of an application specific integrated circuit (ASIC)), a sequencer, and/or some other type of controlling circuitry. In the example shown in FIG. 1A, the controller 140 includes a cache 171, which may store (e.g., at least temporarily) microcode instructions in accordance with a number of embodiments described herein executable (e.g., by a processing resource associated with controller 140 and/or host 110) to perform memory operations. A more detailed diagram of one example of controller 140 is described in association with FIG. 1B.

As described further below, in a number of embodiments, the sensing circuitry 150 can comprise a number of sense amplifiers and a number of compute components, which may serve as, and be referred to herein as an accumulator, and can be used to perform various memory operations (e.g., to perform logical operations on data associated with complementary sense lines). In a number of embodiments, storage locations (e.g., latches) corresponding to the compute components can serve as stages of a shift register. For example, clock signals can be applied to the compute components to shift data from one compute component to an adjacent compute component.

In a number of embodiments, the sensing circuitry 150 can be used to perform logical operations using data stored in array 130 as inputs and store the results of the logical operations back to the array 130 without transferring data via a sense line address access (e.g., without firing a column decode signal). As such, various compute functions can be performed using, and within, sensing circuitry 150 rather than (or in association with) being performed by processing resources external to the sensing circuitry (e.g., by a processor associated with host 110 and/or other processing circuitry, such as ALU circuitry, located on device 120 (e.g., on controller 140 or elsewhere)).

In various previous approaches, data associated with an operand, for instance, would be read from memory via sensing circuitry and provided to external ALU circuitry via I/O lines (e.g., via local I/O lines and/or global I/O lines). The external ALU circuitry could include a number of registers and would perform compute functions using the operands, and the result would be transferred back to the array via the I/O lines. In contrast, in a number of embodiments of the present disclosure, sensing circuitry 150 is configured to perform logical operations on data stored in memory array 130 and store the result back to the memory array 130 without enabling an I/O line (e.g., a local I/O line) coupled to the sensing circuitry 150. The sensing circuitry 150 can be formed on pitch with the sense lines of the array. For example, the cells of memory array may have a particular cell size (e.g., $4F^2$ or $6F^2$, where "F" is a feature size corresponding to the cells). As described further below, in a number of embodiments, sensing components (e.g., respective sense amplifier and compute component pairs) corresponding to sensing circuitry 150 are formed on a same pitch as sense lines of the array and can be operated to perform various compute functions. For instance, if the sense line pitch is 3F, the transistors of the sensing components can fit within the same 3F pitch. In contrast, the devices (e.g., logic gates) associated with ALU circuitry of various processor-in-memory (PIM) systems may not be capable of being formed on pitch with the sense lines, which can increase chip size and/or memory density as compared to a number of embodiments of the present disclosure, for example.

Additional logic circuitry 170 can be coupled to the sensing circuitry 150 and can be used to store (e.g., cache and/or buffer) results of operations described herein.

As such, in a number of embodiments, circuitry external to array 130 and sensing circuitry 150 is not needed to perform compute functions as the sensing circuitry 150 can perform the appropriate logical operations to perform such compute functions without the use of an external processing resource. In a number of embodiments, the sensing circuitry 150 can be operated as a number of 1-bit processing resources, with the sensing components coupled to respective columns of the array 130 serving as respective 1-bit processing elements. Therefore, the sensing circuitry 150 may be used to complement and/or to replace, at least to some extent, an external processing resource such as ALU circuitry of a host.

Enabling an I/O line can include enabling (e.g., turning on) a transistor having a gate coupled to a decode signal (e.g., a column decode signal) and a source/drain coupled to the I/O line. However, embodiments are not limited to performing logical operations using sensing circuitry (e.g., 150) without enabling column decode lines of the array. Whether or not local I/O lines are used in association with performing logical operations via sensing circuitry 150, the local I/O line(s) may be enabled in order to transfer a result to a suitable location other than back to the array 130 (e.g., to an external register).

Figure 1B:
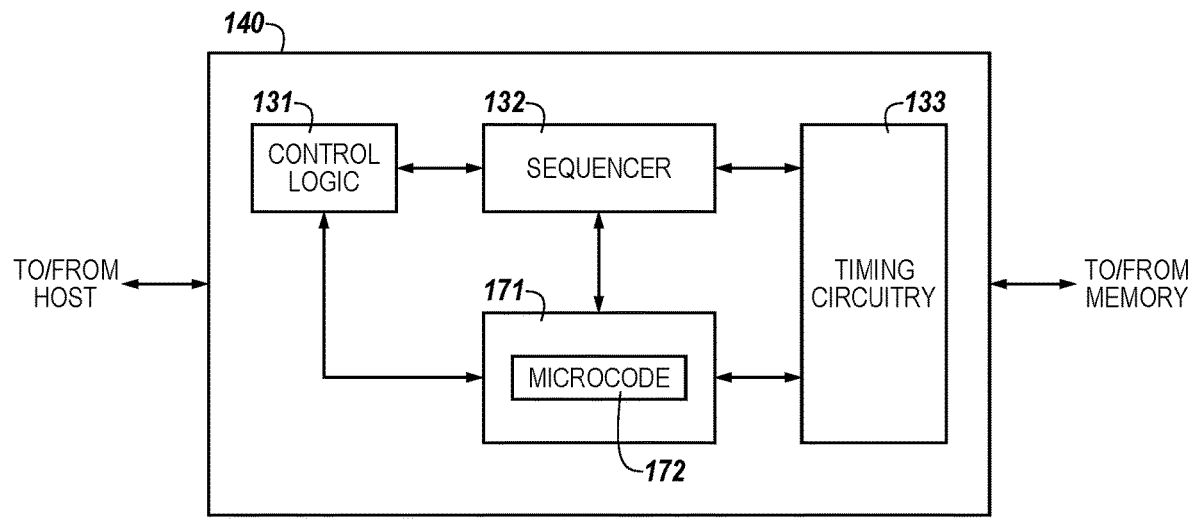
FIG. 1B is a block diagram in greater detail of the controller shown in FIG. 1A in accordance with a number of embodiments of the present disclosure.

FIG. 1B is a block diagram in greater detail of the controller 140 shown in FIG. 1A in accordance with a number of embodiments of the present disclosure. In the example shown in FIG. 1B, the controller 140 is shown comprising control logic 131, sequencer 132, and timing circuitry 133.

As an example, the control logic 131 can comprise a number of components (e.g., program counters, registers, ALUs, branching logic, state machines, etc.) configured to control fetching and executing instructions (e.g., microcode instructions 172). For instance, microcode instructions 172 can be fetched from a memory array (e.g., 130) and/or from a host (e.g., 110) and can be stored in a cache (e.g., cache 171) for execution. In a number of embodiments, the control logic 131 may decode microcode instructions for execution by sequencer 132.

The sequencer 132 may also comprise a number of components (e.g., a number of FIFO buffers, program counter logic, branch logic, registers, microcode instruction cache, ALU, state machines, etc.) configured to execute microcode instructions (e.g., microcode 172) and can report status information such as error conditions detected in the microcode instructions, invalid circuit states, etc. The microcode instructions 172 (e.g., the microcode words) can comprise bits whose values control particular components within the controller 140 (e.g., various ALUs, registers, etc.) as well as components outside of the controller 140 (e.g., sensing circuitry 150, logic 170, decode circuitry 146/185, etc.) to perform various memory operations.

The timing circuitry 133 may comprise a number of components (e.g., state machines, FIFO buffers, a row address strobe chain interface, etc.) to provide timing to coordinate conflict free access to memory such as array 130. As an example, the timing circuitry 133 can coordinate timing between execution of microcode instructions associated with performing logical operations using sensing circuitry 150 and execution of microcode instructions associated with transferring data from array 130 to an external processing resource (e.g., to controller 140 and/or to host 110).

For example, the controller 140 may execute microcode instructions 172 to control regular operations (e.g., writes, reads, copies, erase, etc.) on memory array 130. Additionally, the controller 140 can execute microcode instructions 172 to control sensing circuitry 150 in association with performing various operations (e.g., mathematical operations such as addition, multiplication, etc., by performing Boolean AND operations, OR operations, invert operations, shift operations, etc.) using respective sensing components as processing resources such as described further below.

As such, the controller 140 (e.g., control logic 131, sequencer 132, and timing circuitry 133) may operate to execute sets (e.g., sequences) of microcode instructions 172 to perform various memory operations (e.g., on array 130). As an example, a particular set of microcode instructions can be executed (e.g., by controller 140) to perform, in parallel, a number of mathematical operations on data elements stored (e.g., as vectors) in array 130.

Figure 1C:
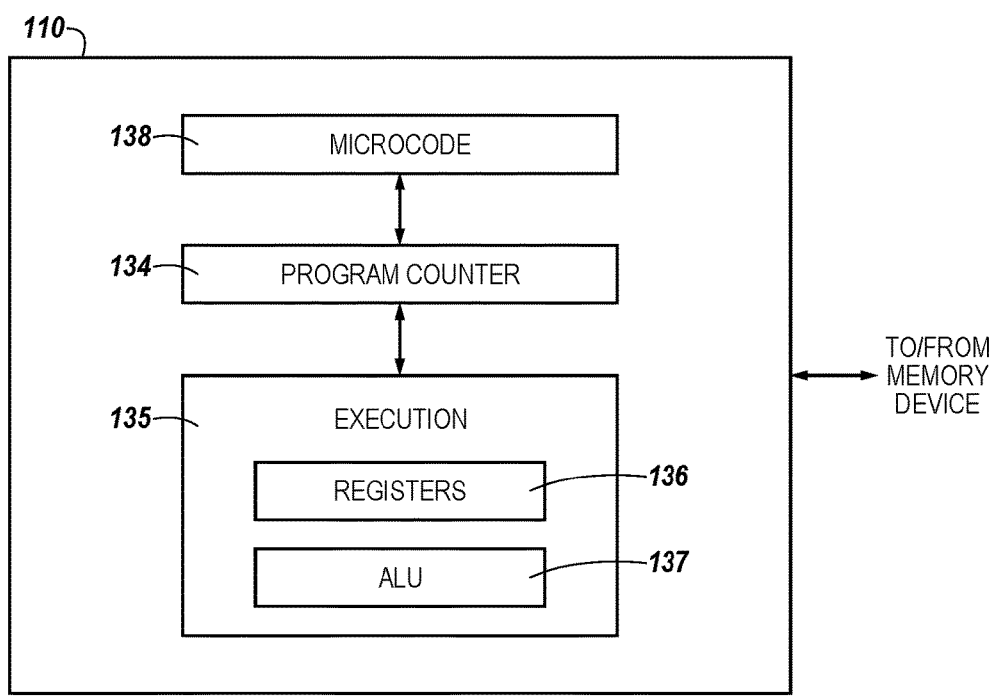
FIG. 1C is a block diagram in greater detail of the host shown in FIG. 1A in accordance with a number of embodiments of the present disclosure.

FIG. 1C is a block diagram in greater detail of the host 110 shown in FIG. 1A in accordance with a number of embodiments of the present disclosure. The host 110 can be, for example, a processor (e.g., a CPU), which can comprise various functional unit circuitry. In this example, the host 110 includes a program counter 134 that can fetch instructions, such as microcode instructions 138 for execution by execution unit 135. The microcode instructions 138 can comprise a number of sets of microcode instructions that may be executed (e.g., in a particular sequence) to perform various memory operations (e.g., in association with executing a program).

Execution of microcode instructions 138 can, for example, control various functions of the program counter 134 (e.g., incrementing the program counter), as well as various functions of other functional unit circuitry of host 110. For instance, in this example, execution unit 135 comprises a number of registers 136 and an ALU 137, whose functions may be controlled by control data units of the microcode instructions 138. The microcode instructions 138 may also be executed to control I/O operations between a number of memory devices (e.g., memory device 120) and the host 110 (e.g., via a bus such as bus 156 shown in FIG. 1A). The microcode instructions 138 can be microcode instructions such as those described below in association with FIG. 2B, for example. The microcode instructions 138 can be stored in memory on host 110 and/or may be retrieved from memory (e.g., memory 130) located on a memory device (e.g., memory device 120) for execution local to host 110.

Figure 2A:
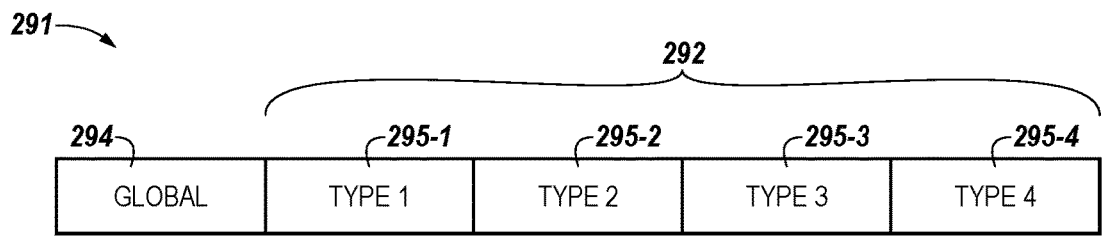
FIG. 2A illustrates a microcode instruction in accordance with previous approaches.
Figure 2B:
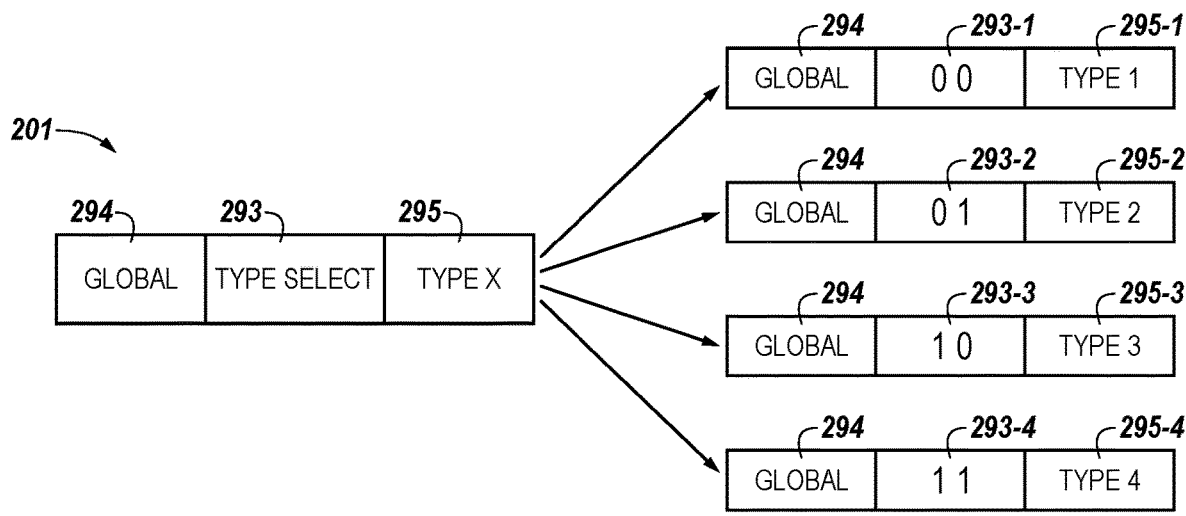
FIG. 2B illustrates a microcode instruction in accordance with a number of embodiments of the present disclosure.

FIG. 2A illustrates a microcode instruction 291 in accordance with previous approaches. FIG. 2B illustrates a microcode instruction in accordance with a number of embodiments of the present disclosure.

The example microcode instruction 291 illustrated in FIG. 2A can be referred to as a microcode word 291 and comprises a number of data units (e.g., bits). In this example, the microcode word 291 includes a field 292 comprising a number of control data units and a field 294 (GLOBAL) comprising a number of global data units. The microcode word 291 can comprise, for example 160 bits with 32 global bits and 128 control bits 292. The quantity of bits of the word 291 (e.g., its size) and/or the particular quantity of global bits (e.g., the size of field 294) and control bits 292 (e.g., the size of field 292) can depend on a particular system. For example, one particular system might be configured to execute 90 bit microcode instructions, which may or may not include any global bits, while another system might be configured to execute 108 bit microcode instructions comprising 92 control bits and 16 global bits. In various instances, the size of the microcode words 291 of a system depends on the quantity of bits needed to encode all of the possible instructions used to perform a desired set of memory operations. For instance, in order to perform a given set operations (e.g., arithmetic operations, bit shifting, etc.) associated with executing a program, for example, 128 bits may be needed in order to encode all of the possible microcode instructions (e.g., in order to control all of the system components associated with performing the desired set of memory operations). As noted above, each bit, or groups of bits, of a microcode word (e.g., word 291) can be used to control different system components (e.g., registers, ALUs, I/O lines, program counters, drivers, etc.).

The global bits of field 294 may include, for example, a number of parity bits and/or error correcting code (ECC) bits corresponding to the word 291, a number of bits associated with microcode error messages, and/or a number of bits associated with microcode debugging. The control bits of field 292 are used to control various components within a computing system in association with performing operations.

In various instances, certain types (e.g., categories) of microcode instructions are not, or cannot, be executed simultaneously. For example, a microcode instruction 291 associated with resetting a system (or resetting a number of particular system components) might not be executable at the same time as a microcode instruction 291 associated with performing an arithmetic operation. Additionally, although each microcode instruction 291 comprises a same quantity of control bits (e.g., the size of field 292 is consistent), various control bits remain unused depending on the type of operation implemented by a particular microcode word 291. For example, a first operation of a first type (e.g., an I/O operation) might be controlled via a first group of the control bits 292, while a second operation of a second type (e.g., an arithmetic operation) might be controlled via a different group of the control bits 292.

In the example shown in FIG. 2A, the control bit field 292 of microcode word 291 comprises a number of fields 295-1 (TYPE 1), 295-2 (TYPE 2), 295-3 (TYPE 3), and 295-4 (TYPE 4) associated with performing different types of operations. As an example, the bits of field 295-1 might be associated with performing mathematic (e.g., arithmetic) operations, the bits of field 295-2 might be associated with performing program counter control operations, the bits of field 295-3 might be associated with performing I/O operations, and the bits of field 295-1 might be associated with performing Boolean operations using sensing circuitry (e.g., 150) as processing components. Since performing the different operation types can be associated with controlling respective different circuitry (e.g., hardware components) within a system (e.g., 100) and/or device (120), the groups of bits corresponding to respective fields 295-1, 295-2, 295-3, and 295-4 can correspond to control of different respective groups of circuitry.

Although the fields 295-1, 295-2, 295-3, and 295-4 are illustrated as being organized sequentially in FIG. 2A, the fields and/or their constituent bits can be at non-sequential bit positions among the control bits 292. Although not shown in FIG. 2A, each of the fields 295-1, 295-2, 295-3, and 295-4 can comprise a number of fields (e.g., sub-fields) corresponding to their different constituent control bits (e.g., fields comprising bits corresponding to control of particular components such as address fields corresponding to operand addresses, register addresses, program counter addresses, among various other fields). Also, although the control bits of field 292 are organized into four different operation types in FIG. 2A, embodiments of the present disclosure are not limited to a particular number of operations types. For example, the control bits 292 might be organized into more or fewer than four "type" fields corresponding to respective different operation types.

As noted above, the size of field 292 can correspond to the quantity of bits used to perform any one of a set of operations (e.g., any desired operation independent of the particular operation type). However, only a subset (e.g., 295-1, 295-2, 295-3, and 295-4) of the control bits 292 might be associated with performing a selected operation. For instance, in various previous approaches, performing each operation involves fetching and executing a whole word 291 even though several of the bits 292 do not affect components associated with performing the particular operation (e.g., the components affected by the control bits of fields 295-1, 295-2, and 295-3 are not the same as the components affected by the control bits of field 295-4 associated with performing an operation corresponding to type 4).

FIG. 2B illustrates a microcode instruction 201 in accordance with a number of embodiments of the present disclosure. Similar to the microcode instruction 291 illustrated in FIG. 2A, the microcode instruction 201 can be referred to as a microcode word 201 and comprises a number of data units (e.g., bits). In this example, the microcode word 201 includes a field 295 (TYPE X) comprising a number of control bits, a field 293 (TYPE SELECT) comprising a number of type select bits, and a field 294 (GLOBAL) comprising a number of global bits. The function of the global bits of field 294 in microcode word 201 can be similar to the function of the global bits of microcode word 291 (e.g., parity, ECC, debugging, error messages, etc.).

Unlike the microcode word 291 shown in FIG. 2A, in which the particular functions corresponding to the control bits within field 292 are not variable (e.g., they remain static), the particular functions corresponding to the control bits within field 295 of microcode word 201 are variable. For example, the particular functions corresponding to the control bits of field 295 are variable based on the type select bits of field 293. In accordance with a number of embodiments, the type select bits of field 293 indicate a particular operation type of a number of operation types implemented by the control bits of field 295. For instance, the type select bits can be used to select between different operation types implementable via a single microcode word 201, which can reduce the size of microcode words (e.g., as compared to the size of previous microcode words such as word 291 described in FIG. 2A). To further illustrate the variable nature of the control bits of field 295 of microcode word 201, as compared to the static nature of the control bits of field 292 of microcode word 291, consider the following. If we consider sixteen bits at sixteen respective bit positions within field 292 of word 291, the functions of those sixteen bits (e.g., the respective control signals corresponding to the bit values and/or the respective hardware components controlled thereby) remain the same independent of which operation type (e.g., TYPE 1, TYPE 2, TYPE 3, and TYPE 4) the word 291 is configured to implement. In contrast, if we consider sixteen bits at sixteen respective bit positions within field 295 of word 201, the functions of those sixteen bits (e.g., the respective control signals corresponding to the bit values and/or the respective hardware components controlled thereby) change depending on the value of the type select bits of field 293. For example, if the type select bits have a first value (e.g., "00"), the sixteen bits might correspond to controlling one or more particular registers, and if the type select bits have a second value (e.g., "11"), the same sixteen bits might correspond to controlling one or more program counters.

In the example shown in FIG. 2B, the type select field 293 comprises two type select bits, whose values can be used to indicate one of four different operation types corresponding to field 295. For instance, as shown in FIG. 2B, the control bits of field 295 can correspond to one of four different operation types (e.g., TYPE 1, TYPE 2, TYPE 3, and TYPE 4) depending on the values of the bits of field 293. In this example, the type select bits of field 293 having a value of "00" (e.g., as shown in field 293-1) indicates that the control bits of field 295 correspond to an operation of TYPE 1 (e.g., as shown in field 295-1). The type select bits of field 293 having a value of "01" (e.g., as shown in field 293-2) indicates that the control bits of field 295 correspond to an operation of TYPE 2 (e.g., as shown in field 295-2). The type select bits of field 293 having a value of "10" (e.g., as shown in field 293-3) indicates that the control bits of field 295 correspond to an operation of TYPE 3 (e.g., as shown in field 295-3). Also, the type select bits of field 293 having a value of "11" (e.g., as shown in field 293-4) indicates that the control bits of field 295 correspond to an operation of TYPE 4 (e.g., as shown in field 295-4).

Using type select bits to indicate the particular operation type to which the control bits correspond can provide benefits such as reducing the size of a microcode word (e.g., 201) as compared to the size of previous microcode words (e.g., 291). For instance, if the size of field 292 of microcode word 291 is 128 bits (e.g., with each of fields 295-1 to 295-4 comprising 32 bits), then performing a single microcode operation of each type (e.g., TYPE 1, TYPE 2, TYPE 3, and TYPE 4) would involve fetching and executing four microcode words 291 each comprising 128 control bits (plus a number of global bits). In contrast, the two select bits of field 293 can be used to select between the four different operation types such that performing a single microcode operation of each type would involve fetching and executing four microcode words 201 each comprising 32 control bits and 2 type select bits (plus a number of global bits). Since the inclusion of a type select field 293 reduces the size of the microcode words, a particular memory location (e.g., cache) can store more microcode words 201 as compared to microcode words 291, which can increase the speed and/or efficiency of a computing system, among other benefits.

Embodiments are not limited to the example shown in the FIG. 2B. For instance, the type select field 293 can comprise more or fewer than two bits. For instance, as described further in association with FIG. 3, the type select field 293 can comprise a single bit whose value (e.g., "1" or "0") can be used to select between two different operation types, or more than two bits can be used to select between multiple (e.g., $2^N$ where N is the quantity of type select bits) different operation types.

Figure 3:
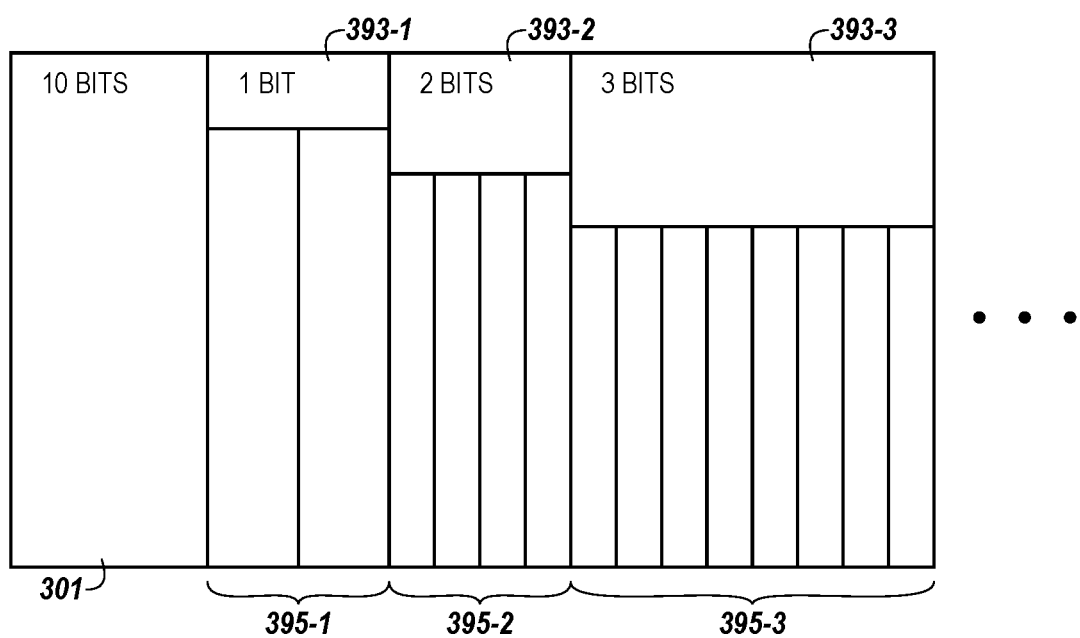
FIG. 3 illustrates a number of microcode instructions with various number of type select data units in accordance with a number of embodiments of the present disclosure.

FIG. 3 illustrates a table showing different numbers of type select bits and control bits for a microcode instruction having a particular size in accordance with a number of embodiments of the present disclosure. The table shown in FIG. 3 assumes a microcode instruction size of 10 bits. Accordingly, as shown in FIG. 2, assuming none of the 10 bits are used as type select bits, the microcode word 301 comprises zero type select bits. However, if one of the 10 bits is used as a type select bit (e.g., field 393-1 comprises one bit), then the type select bit can be used to select between two different operation types corresponding to operation type field 395-1, which comprises 9 bits (e.g., 10 total bits−1 type select bit). If two of the 10 bits are used as type select bits (e.g., field 393-2 comprises two bits), then the type select bits can represent four different values and, as such, can be used to select from among four different operation types corresponding to operation type field 395-2, which comprises 8 bits (e.g., 10 total bits−2 type select bits). If three of the 10 bits are used as type select bits (e.g., field 393-3 comprises three bits), then the type select bits can represent eight different values and, as such, can be used to select from among up to eight different operation types corresponding to operation type field 395-3, which comprises 7 bits (e.g., 10 total bits−3 type select bits).

In this manner, a 10-bit microcode instruction comprising zero type select bits (e.g., instruction 301) could comprise 10 control bits configured to perform 10 different functions (e.g., to control 10 different hardware components). In contrast, for a 10-bit microcode instruction comprising a 2-bit type select field (e.g., 393-2) the 8 remaining control bits could be configured to perform up to 32 different functions depending on the values of the type select bits (e.g., each of the 8 control bits could correspond to a different hardware component, or portion thereof, depending on the particular values of the two type select bits). Similarly, for a 10-bit microcode instruction comprising a 3-bit type select field (e.g., 393-3) the 7 remaining control bits could be configured to perform up to 56 different functions depending on the values of the type select bits (e.g., each of the 7 control bits could correspond to a different hardware component, or portion thereof, depending on the particular values of the three type select bits). As described in association with FIG. 2B, in a number of embodiments, the different values of the bits within the type select fields (e.g., 393-1, 393-2, and 393-3) can correspond to respective different operation types. For instance, a first value might correspond to arithmetic functions, a second value might correspond to program counter operations, a third value might correspond to I/O operation, a fourth value might correspond to Boolean operations, etc. However, embodiments are not limited to particular operation types.

Including type select bits within microcode instructions in accordance with embodiments described herein can provide benefits such as reducing the size of microcode words associated with performing particular operations. For instance, a prior art microcode instruction set might comprise microcode words comprising 128 control bits used to perform four different operation types. As an example, each of four different groups of the control 128 bits (e.g., four groups of 32 bits) can correspond to the four different operation types. As such, performing an operation from each of the four different operation types would include fetching and executing four different microcode words each comprising 128 control bits (plus additional global bits). In contrast, a microcode instruction set in accordance with the present disclosure might comprise microcode words comprising 32 control bits and two type select bits used to select between four different operation types. Accordingly, in this example, performing an operation from each of the four different operation types would include fetching and executing four different microcode words each comprising 32 control bits (plus additional global bits and the two type select bits). Therefore, the reduced size of microcode words as compared to prior art microcode words can result in the ability to store more microcode words in a given amount of memory, among other benefits.

Figure 4:
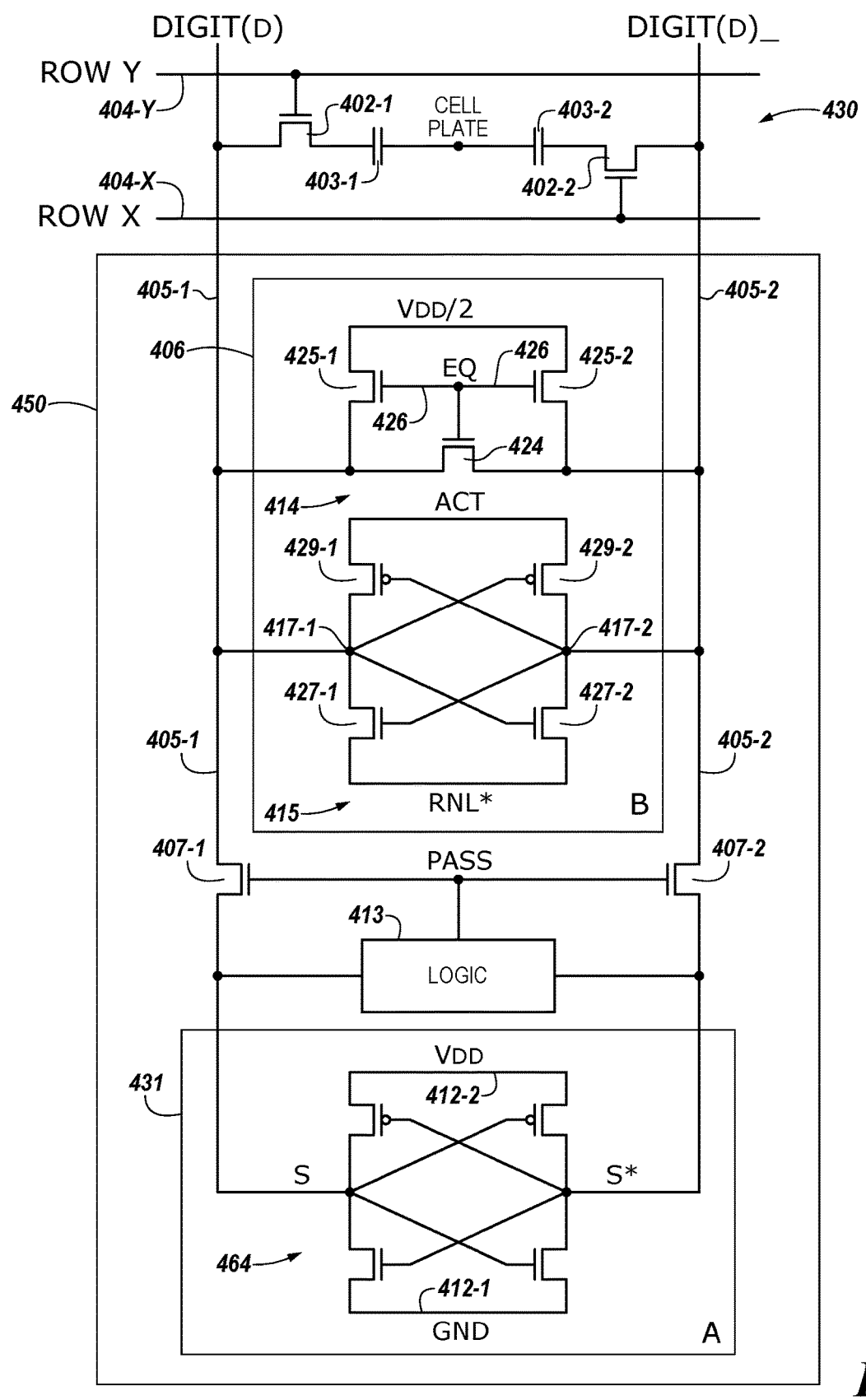
FIG. 4 is a schematic diagram illustrating sensing circuitry in accordance with a number of embodiments of the present disclosure.

FIG. 4 is a schematic diagram illustrating sensing circuitry 450 in accordance with a number of embodiments of the present disclosure. The sensing circuitry 450 can correspond to sensing circuitry 150 shown in FIG. 1 and can be controlled via microcode instructions in accordance with embodiments described herein.

In the example shown in FIG. 4, a memory cell can include a storage element (e.g., capacitor) and an access device (e.g., transistor). For instance, a first memory cell can include transistor 402-1 and capacitor 403-1, and a second memory cell can include transistor 402-2 and capacitor 403-2, etc. In this embodiment, the memory array 430 is a DRAM array of 1T1C (one transistor one capacitor) memory cells, although other cell configurations can be used (e.g., 2T2C with two transistors and two capacitors per memory cell). In a number of embodiments, the memory cells may be destructive read memory cells (e.g., reading the data stored in the cell destroys the data such that the data originally stored in the cell is refreshed after being read).

Figure 5:
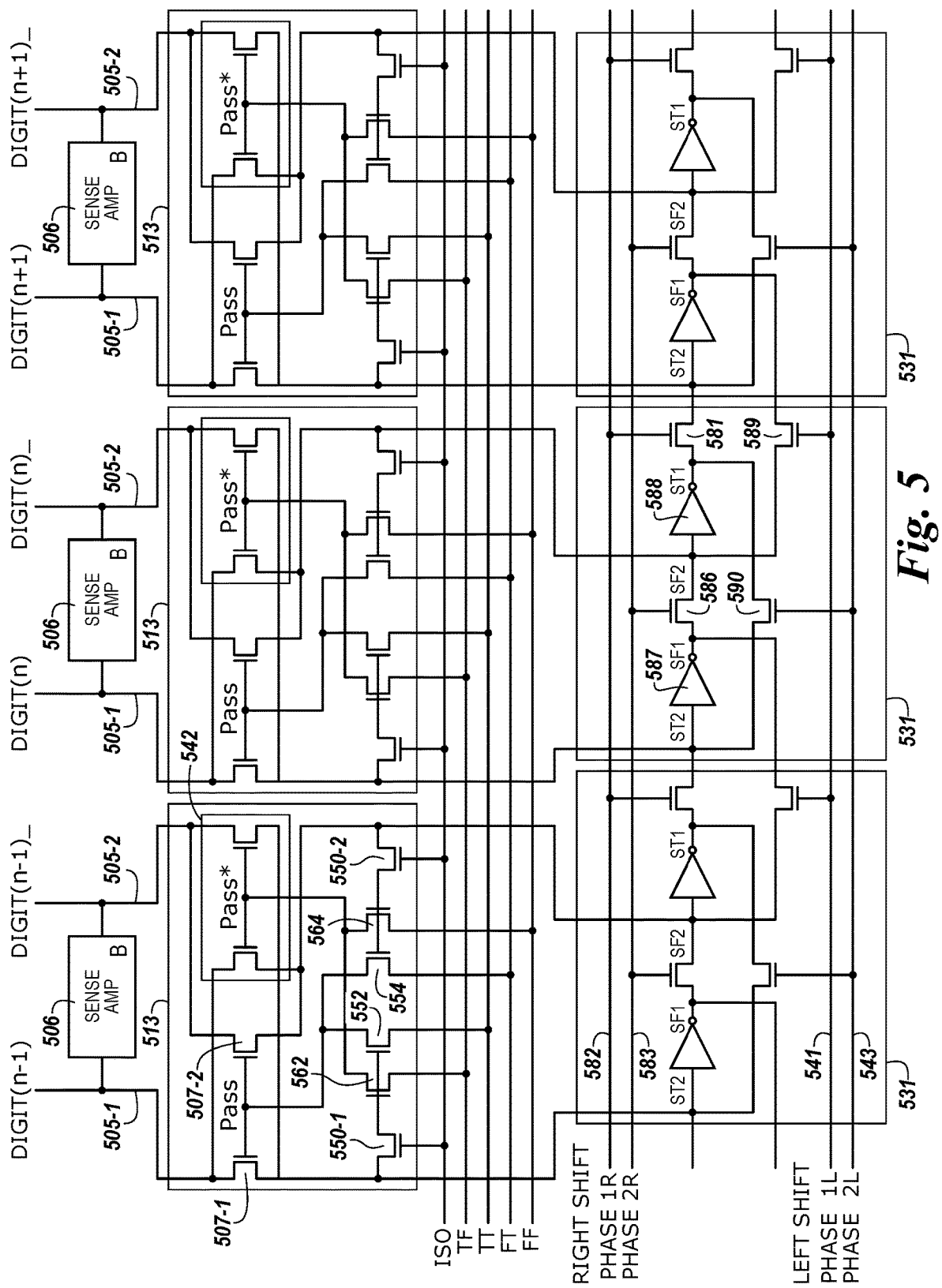
FIG. 5 is a schematic diagram illustrating sensing circuitry in accordance with a number of embodiments of the present disclosure.

The cells of the memory array 430 can be arranged in rows coupled by access (word) lines 404-X (ROW X), 404-Y (ROW Y), etc., and columns coupled by pairs of complementary sense lines (e.g., digit lines DIGIT(D) and DIGIT(D)_ shown in FIG. 4 and DIGIT_(n) and DIGIT_(n)_ shown in FIG. 5). The individual sense lines corresponding to each pair of complementary sense lines can also be referred to as digit lines 405-1 for DIGIT (D) and 405-2 for DIGIT (D)_, respectively. Although only one pair of complementary digit lines are shown in FIG. 4, embodiments of the present disclosure are not so limited, and an array of memory cells can include additional columns of memory cells and digit lines (e.g., 4,096, 8,192, 16,384, etc.).

Although rows and columns are illustrated as being orthogonal to each other, embodiments are not so limited. For example, the rows and columns may be oriented relative to each other in various other two-dimensional or three-dimensional configurations.

Memory cells can be coupled to different digit lines and word lines. For example, a first source/drain region of a transistor 402-1 can be coupled to digit line 405-1 (D), a second source/drain region of transistor 402-1 can be coupled to capacitor 403-1, and a gate of a transistor 402-1 can be coupled to word line 404-Y. A first source/drain region of a transistor 402-2 can be coupled to digit line 405-2 (D)_, a second source/drain region of transistor 402-2 can be coupled to capacitor 403-2, and a gate of a transistor 402-2 can be coupled to word line 404-X. A cell plate, as shown in FIG. 4, can be coupled to each of capacitors 403-1 and 403-2. The cell plate can be a common node to which a reference voltage (e.g., ground) can be applied in various memory array configurations.

The memory array 430 is configured to couple to sensing circuitry 450 in accordance with a number of embodiments of the present disclosure. In this embodiment, the sensing circuitry 450 comprises a sense amplifier 406 and a compute component 431 corresponding to respective columns of memory cells (e.g., coupled to respective pairs of complementary digit lines). The sense amplifier 406 can be coupled to the pair of complementary digit lines 405-1 and 405-2. The compute component 431 can be coupled to the sense amplifier 406 via pass gates 407-1 and 407-2. The gates of the pass gates 407-1 and 407-2 can be coupled to operation selection logic 413.

The operation selection logic 413 can be configured to include pass gate logic for controlling pass gates that couple the pair of complementary digit lines un-transposed between the sense amplifier 406 and the compute component 431 and swap gate logic for controlling swap gates that couple the pair of complementary digit lines transposed between the sense amplifier 406 and the compute component 431. The operation selection logic 413 can also be coupled to the pair of complementary digit lines 405-1 and 405-2. The operation selection logic 413 can be configured to control pass gates 407-1 and 407-2 based on a selected operation.

The sense amplifier 406 can be operated to determine a data value (e.g., logic state) stored in a selected memory cell. The sense amplifier 406 can comprise a cross coupled latch, which can be referred to herein as a primary latch. In the example illustrated in FIG. 4, the circuitry corresponding to sense amplifier 406 comprises a latch 415 including four transistors coupled to a pair of complementary digit lines D 405-1 and (D)_ 405-2. However, embodiments are not limited to this example. The latch 415 can be a cross coupled latch (e.g., gates of a pair of transistors) such as n-channel transistors (e.g., NMOS transistors) 427-1 and 427-2 are cross coupled with the gates of another pair of transistors, such as p-channel transistors (e.g., PMOS transistors) 429-1 and 429-2).

In operation, when a memory cell is being sensed (e.g., read), the voltage on one of the digit lines 405-1 (D) or 405-2 (D)_ will be slightly greater than the voltage on the other one of digit lines 405-1 (D) or 405-2 (D)_. An ACT signal and an RNL* signal can be driven low to enable (e.g., fire) the sense amplifier 406. The digit lines 405-1 (D) or 405-2 (D)_ having the lower voltage will turn on one of the PMOS transistor 429-1 or 429-2 to a greater extent than the other of PMOS transistor 429-1 or 429-2, thereby driving high the digit line 405-1 (D) or 405-2 (D)_ having the higher voltage to a greater extent than the other digit line 405-1 (D) or 405-2 (D)_ is driven high.

Similarly, the digit line 405-1 (D) or 405-2 (D)_ having the higher voltage will turn on one of the NMOS transistor 427-1 or 427-2 to a greater extent than the other of the NMOS transistor 427-1 or 427-2, thereby driving low the digit line 405-1 (D) or 405-2 (D)_ having the lower voltage to a greater extent than the other digit line 405-1 (D) or 405-2 (D)_ is driven low. As a result, after a short delay, the digit line 405-1 (D) or 405-2 (D)_ having the slightly greater voltage is driven to the voltage of the supply voltage $V_{CC}$ through a source transistor, and the other digit line 405-1 (D) or 405-2 (D)_ is driven to the voltage of the reference voltage (e.g., ground) through a sink transistor. Therefore, the cross coupled NMOS transistors 427-1 and 427-2 and PMOS transistors 429-1 and 429-2 serve as a sense amplifier pair, which amplify the differential voltage on the digit lines 405-1 (D) and 405-2 (D)_ and operate to latch a data value sensed from the selected memory cell.

Embodiments are not limited to the sense amplifier 406 configuration illustrated in FIG. 4. As an example, the sense amplifier 406 can be a current-mode sense amplifier and a single-ended sense amplifier (e.g., sense amplifier coupled to one digit line). Also, embodiments of the present disclosure are not limited to a folded digit line architecture such as that shown in FIG. 4.

The sense amplifier 406 can, in conjunction with the compute component 431, be operated to perform various operations using data from an array as input. In a number of embodiments, the result of an operation can be stored back to the array without transferring the data via a digit line address access (e.g., without firing a column decode signal such that data is transferred to circuitry external from the array and sensing circuitry via local I/O lines). As such, a number of embodiments of the present disclosure can enable performing operations using less power than various previous approaches. Additionally, since a number of embodiments eliminate the need to transfer data across local and global I/O lines and/or external data buses in order to perform compute functions (e.g., between memory and discrete processor), a number of embodiments can enable an increased (e.g., faster) processing capability as compared to previous approaches.

The sense amplifier 406 can further include equilibration circuitry 414, which can be configured to equilibrate the digit lines 405-1 (D) and 405-2 (D)_. In this example, the equilibration circuitry 414 comprises a transistor 424 coupled between digit lines 405-1 (D) and 405-2 (D)_. The equilibration circuitry 414 also comprises transistors 425-1 and 425-2 each having a first source/drain region coupled to an equilibration voltage (e.g., $V_{DD}/2$), where $V_{DD}$ is a supply voltage associated with the array. A second source/drain region of transistor 425-1 can be coupled digit line 405-1 (D), and a second source/drain region of transistor 425-2 can be coupled digit line 405-2 (D)_. Gates of transistors 424, 425-1, and 425-2 can be coupled together, and to an equilibration (EQ) control signal line 426. As such, activating EQ enables the transistors 424, 425-1, and 425-2, which effectively shorts digit lines 405-1 (D) and 405-2 (D)_ together and to the equilibration voltage (e.g., $V_{DD}/2$).

As described further below, in a number of embodiments, the sensing circuitry 450 (e.g., sense amplifier 406 and compute component 431) can be operated to perform a selected operation and initially store the result in one of the sense amplifier 406 or the compute component 431 without transferring data from the sensing circuitry via a local or global I/O line (e.g., without performing a sense line address access via activation of a column decode signal, for instance).

As shown in FIG. 4, the compute component 431 can also comprise a latch, which can be referred to herein as a secondary latch 464. The secondary latch 464 can be configured and operated in a manner similar to that described above with respect to the primary latch 415, with the exception that the pair of cross coupled p-channel transistors (e.g., PMOS transistors) included in the secondary latch can have their respective sources coupled to a supply voltage (e.g., $V_{DD}$), and the pair of cross coupled n-channel transistors (e.g., NMOS transistors) of the secondary latch can have their respective sources selectively coupled to a reference voltage (e.g., ground), such that the secondary latch is continuously enabled. The configuration of the compute component 431 is not limited to that shown in FIG. 4, and various other embodiments are feasible.

FIG. 5 is a schematic diagram illustrating sensing circuitry in accordance with a number of embodiments of the present disclosure. FIG. 5 illustrates a number of columns of an array each comprising a pair of complementary sense lines 505-1 and 505-2 coupled to a corresponding sense amplifier 506 and a compute component 531. The compute components 531 can be coupled to the sense amplifiers 506 via pass gates 507-1 and 507-2. The sense amplifiers 506 shown in FIG. 5 can correspond to sense amplifier 406 shown in FIG. 4. The sensing circuitry shown in FIG. 5 can correspond to sensing circuitry 150 shown in FIG. 1A, for example. The logical operation selection logic 513 shown in FIG. 5 can correspond to logical operation selection logic 413 shown in FIG. 4.

The gates of the pass gates 507-1 and 507-2 can be controlled by a logical operation selection logic signal, Pass. For example, an output of the logical operation selection logic can be coupled to the gates of the pass gates 507-1 and 507-2. The compute components 531 can latch respective data values, and can be operated as a shift register via shifting of the data values (e.g., right and/or left).

As an example, the compute components 531 can comprise respective stages (e.g., shift cells) of a shift register configured to shift data values left and/or right. For example, as illustrated in FIG. 5, each compute component 531 (e.g., stage) of the shift register comprises a pair of right-shift transistors 581 and 586, a pair of left-shift transistors 589 and 590, and a pair of inverters 587 and 588. The signals PHASE 1R, PHASE 2R, PHASE 1L, and PHASE 2L can be applied to respective control lines 582, 583, 541 and 543 to enable/disable feedback on the latches of the corresponding compute components 531 in association with performing logical operations and/or shifting data in accordance with embodiments described herein.

The sensing circuitry shown in FIG. 5 also shows a logical operation selection logic 513 coupled to a number of logic selection control input control lines, including ISO, TF, TT, FT, and FF. Selection of a logical operation from a plurality of logical operations is determined from the condition of logic selection control signals on the logic selection control input control lines, as well as the data values present on the pair of complementary sense lines 505-1 and 505-2 when the isolation transistors 550-1 and 550-2 are enabled via the ISO control signal being asserted.

According to various embodiments, the logical operation selection logic 513 can include four logic selection transistors: logic selection transistor 562 coupled between the gates of the swap transistors 542 and a TF signal control line, logic selection transistor 552 coupled between the gates of the pass gates 507-1 and 507-2 and a TT signal control line, logic selection transistor 554 coupled between the gates of the pass gates 507-1 and 507-2 and a FT signal control line, and logic selection transistor 564 coupled between the gates of the swap transistors 542 and a FF signal control line. Gates of logic selection transistors 562 and 552 are coupled to the true sense line through isolation transistor 550-1 (having a gate coupled to an ISO signal control line). Gates of logic selection transistors 564 and 554 are coupled to the complementary sense line through isolation transistor 550-2 (also having a gate coupled to an ISO signal control line).

Data values present on the pair of complementary sense lines 505-1 and 505-2 can be loaded into the compute component 531 via the pass gates 507-1 and 507-2. When the pass gates 507-1 and 507-2 are OPEN (e.g., conducting), data values on the pair of complementary sense lines 505-1 and 505-2 are passed to the compute components 531 (e.g., loaded into the shift register). The data values on the pair of complementary sense lines 505-1 and 505-2 can be the data value stored in the sense amplifier 506 when the sense amplifier is fired. The logical operation selection logic signal, Pass, is high to OPEN the pass gates 507-1 and 507-2.

The ISO, TF, TT, FT, and FF control signals can operate to select a logical function to implement based on the data value ("B") in the sense amplifier 506 and the data value ("A") in the compute component 531. In particular, the ISO, TF, TT, FT, and FF control signals are configured to select the logical function to implement independent from the data value present on the pair of complementary sense lines 505-1 and 505-2 (although the result of the implemented logical operation can be dependent on the data value present on the pair of complementary sense lines 505-1 and 505-2. That is, the ISO, TF, TT, FT, and FF control signals select the logical operation to implement directly since the data value present on the pair of complementary sense lines 505-1 and 505-2 is not passed through logic to operate the gates of the pass gates 507-1 and 507-2.

Additionally, FIG. 5 shows swap transistors 542 configured to swap the orientation of the pair of complementary sense lines 505-1 and 505-2 between the sense amplifier 506 and the compute component 531. When the swap transistors 542 are OPEN, data values on the pair of complementary sense lines 505-1 and 505-2 on the sense amplifier 506 side of the swap transistors 542 are oppositely-coupled to the pair of complementary sense lines 505-1 and 505-2 on the compute component 531 side of the swap transistors 542, and thereby loaded into the loadable shift register of the compute component 531.

The logical operation selection logic signal Pass can be activated (e.g., high) to OPEN the pass gates 507-1 and 507-2 when the ISO control signal line is activated and either the TT control signal is activated (e.g., high) and data value on the true sense line is "1" or the FT control signal is activated (e.g., high) and the data value on the complement sense line is "1."

The data value on the true sense line being a "1" OPENs logic selection transistors 552 and 562. The data value on the complementary sense line being a "1" OPENs logic selection transistors 554 and 564. If the ISO control signal or either the respective TT/FT control signal or the data value on the corresponding sense line (e.g., sense line to which the gate of the particular logic selection transistor is coupled) is not high, then the pass gates 507-1 and 507-2 will not be OPENed by a particular logic selection transistor.

The logical operation selection logic signal Pass* can be activated (e.g., high) to OPEN the swap transistors 542 (e.g., conducting) when the ISO control signal line is activated and either the TF control signal is activated (e.g., high) and data value on the true sense line is "1," or the FF control signal is activated (e.g., high) and the data value on the complement sense line is "1." If either the respective control signal or the data value on the corresponding sense line (e.g., sense line to which the gate of the particular logic selection transistor is coupled) is not high, then the swap transistors 542 will not be OPENed by a particular logic selection transistor.

The Pass* control signal is not necessarily complementary to the Pass control signal. It is possible for the Pass and Pass* control signals to both be activated or both be deactivated at the same time. However, activation of both the Pass and Pass* control signals at the same time shorts the pair of complementary sense lines together, which may be a disruptive configuration to be avoided.

The sensing circuitry illustrated in FIG. 5 is configured to select one of a plurality of logical operations to implement directly from the four logic selection control signals (e.g., logical operation selection is not dependent on the data value present on the pair of complementary sense lines). Some combinations of the logic selection control signals can cause both the pass gates 507-1 and 507-2 and swap transistors 542 to be OPEN at the same time, which shorts the pair of complementary sense lines 505-1 and 505-2 together. According to a number of embodiments of the present disclosure, the logical operations which can be implemented by the sensing circuitry illustrated in FIG. 5 can be the logical operations summarized in the logic tables shown in FIG. 6.

FIG. 6 is a logic table illustrating selectable logic operation results implemented by a sensing circuitry shown in FIG. 5 in accordance with a number of embodiments of the present disclosure. The four logic selection control signals (e.g., TF, TT, FT, and FF), in conjunction with a particular data value present on the complementary sense lines, can be used to select one of plural logical operations to implement involving the starting data values stored in the sense amplifier 506 and compute component 531. The four control signals, in conjunction with a particular data value present on the complementary sense lines, controls the states of the pass gates 507-1 and 507-2 and swap transistors 542, which in turn affects the data value in the compute component 531 and/or sense amplifier 506 before/after firing. The capability to selectably control states of the swap transistors 542 facilitates implementing logical operations involving inverse data values (e.g., inverse operands and/or inverse result), among others.

Logic Table 6-1 illustrated in FIG. 6 shows the starting data value ("A") stored in the compute component 531 shown in column 644, and the starting data value ("B") stored in the sense amplifier 506 shown in column 645. The other 3 column headings in Logic Table 6-1 refer to the states of the pass gates 507-1 and 507-2, and the swap transistors 542, which can respectively be controlled to be OPEN (e.g., conducting) or CLOSED (e.g., not conducting) depending on the state of the four logic selection control signals (e.g., TF, TT, FT, and FF), in conjunction with a particular data value present on the pair of complementary sense lines 505-1 and 505-2. The "NOT OPEN" column corresponds to the pass gates 507-1 and 507-2 and the swap transistors 542 both being in a non-conducting condition, the "OPEN TRUE" corresponds to the pass gates 507-1 and 507-2 being in a conducting condition, and the "OPEN INVERT" corresponds to the swap transistors 542 being in a conducting condition. The configuration corresponding to the pass gates 507-1 and 507-2 and the swap transistors 542 both being in a conducting condition is not reflected in Logic Table 6-1 since this results in the sense lines being shorted together.

Via selective control of the pass gates 507-1 and 507-2 and the swap transistors 542, each of the three columns of the upper portion of Logic Table 6-1 can be combined with each of the three columns of the lower portion of Logic Table 6-1 to provide 3×3=9 different result combinations, corresponding to nine different logical operations, as indicated by the various connecting paths shown at 675. The nine different selectable logical operations that can be implemented by the sensing circuitry, e.g., 150 in FIG. 1A, are summarized in Logic Table 6-2 illustrated in FIG. 6, including an XOR logical operation.

The columns of Logic Table 6-2 illustrated in FIG. 6 show a heading 680 that includes the state of the logic selection control signals (FF, FT, TF and TT). For example, the state of a first logic selection control signal is provided in row 676, the state of a second logic selection control signal is provided in row 677, the state of a third logic selection control signal is provided in row 678, and the state of a fourth logic selection control signal is provided in row 679. The particular logical operation corresponding to the results is summarized in row 647.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory storing a set of microcode instructions, each microcode instruction of the set comprising:
a number of control data units; and
a number of type select data units, wherein:
the number of control data units and the number of type select data units are received and executed at a same execution unit; and
a quantity of the microcode instructions stored in the memory is equal to a number of operations performable by the apparatus;
wherein each microcode instruction of the set has a particular instruction type indicated by a value of the number of type select data units;
wherein the number of control data units whose functions are variable based on the particular instruction type is capable of controlling components within a controller as well as components outside of the controller including sensing circuitry.

2. The apparatus of claim 1, wherein each microcode instruction of the set comprises N number of type select data units capable of indicating a particular one of $2^N$ different instruction types.

3. The apparatus of claim 2, wherein the controller is coupled to the memory and configured to determine the particular instruction type based on the value of the number of type select data units.

4. The apparatus of claim 3, wherein the controller is configured to execute a sequence of microcode instructions with execution of each microcode instruction involving performance of a number of functions controlled by a value of the control data units.

5. The apparatus of claim 4, wherein the sequence of microcode instructions comprises:
a first microcode instruction of the set, and wherein a value of the type select data units of the first microcode instructions is a first value; and
a second microcode instruction of the set, and wherein a value of the type select data units of the second microcode instruction is different than the first value.

6. The method of claim 1, wherein the number of type select data units comprises at least two bits.

7. An apparatus, comprising:
a memory storing a set of microcode instructions; and
a controller coupled to the memory and configured to:
determine, in response to receipt of a number of microcode instructions from the memory, an instruction type corresponding to each one of the number of microcode instructions based on a value of a number of type select data units within each of the number of microcode instructions;
coordinate, using timing circuitry of the controller, timing between execution of a first one of the number of microcode instructions and a second one of the number of microcode instructions; and
execute the number of microcode instructions in accordance with the determined instruction type to perform at least a portion of a memory operation based on values of a number of control data units within the microcode instruction;
wherein functions to which the number of control data units correspond are dependent upon the determined instruction type, and the number of control data units is capable of controlling components within the controller as well as components outside of the controller including sensing circuitry.

8. The apparatus of claim 7, wherein the number of type select data units comprises at least two type select data units, and wherein the microcode instructions of the set are capable of having at least four different instruction types.

9. The apparatus of claim 8, wherein a first instruction type is associated with performing Boolean operations, and a second instruction type is associated with performing input/output (I/O) operations.

10. The apparatus of claim 9, wherein a third instruction type is associated with performing one of:
reset operations; and
program counter operations.

11. The apparatus of claim 7, wherein the microcode instruction further comprises a number of global data units whose function is not dependent upon the determined instruction type.

12. The apparatus of claim 11, wherein the number of global data units comprise at least one of:
parity bits; and
debug bits.

13. A method for operating a computing system, comprising:
receiving, at a controller, a microcode instruction, wherein the microcode instruction is decoded and received at the controller;
wherein the decoded microcode instruction comprises:
a number of control data units; and
a number of type select data units; and
executing, by the controller, the decoded microcode instruction comprising the number of control data units and the number of type select data units; and
wherein the microcode instruction is one of a plurality of microcode instructions each having an associated instruction type, and wherein the number of control data units whose functions are variable based on the associated instruction type is capable of controlling components within a controller as well as components outside of the controller including sensing circuitry.

14. The method of claim 13, wherein the microcode instruction is one of a sequence of microcode instructions, and wherein the method includes executing the sequence of microcode instructions to perform the particular memory operation, and wherein at least two microcode instructions of the sequence have different associated instruction types.

15. The method of claim 14, wherein the at least two microcode instructions comprise at least one arithmetic operation and at least one program counter operation.

16. The method of claim 13, wherein the microcode instruction comprises a number of global data units whose function is independent of the associated instruction type.

17. A method for executing a microcode instruction, comprising:
retrieving, by a controller, a microcode instruction from a memory, wherein a quantity of the microcode instructions stored in the memory is equal to a number of operations performable by the controller;
determining, by the controller, an instruction type of the microcode instruction based on a value of a number of type select data units within the microcode instruction; and
executing the microcode instruction in accordance with the determined instruction type to perform at least a portion of a memory operation based on values of a number of control data units within the microcode instruction;
wherein functions corresponding to the number of control data units are dependent upon the determined instruction type, and the number of control data units is capable of controlling components within a controller as well as components outside of the controller including sensing circuitry.

18. The method of claim 17, wherein the method includes executing the microcode instruction on the controller of a memory device.

19. The method of claim 18, wherein the method includes receiving the microcode instruction from the memory on a host coupled to the controller via a bus.

20. The method of claim 17, wherein determining the instruction type comprises determining values of at least two type select data units.

21. An apparatus comprising a processing resource, wherein the processing resource is configured to:
retrieve a microcode instruction from a memory, wherein a quantity of microcode instructions stored in the memory is equal to a number of operations performable by the apparatus; and
execute the microcode instruction comprising:
a number of control data units; and
a number of type select data units indicating a particular instruction type of a number of types, wherein the number of control data units whose functions are variable based on the particular instruction type is capable of controlling components within the processing resource as well as components outside of the processing resource including sensing circuitry; and
wherein the microcode instruction is executed to perform a particular memory operation.

22. The apparatus of claim 21, wherein the processing resource comprises a processor.

23. The apparatus of claim 21, wherein the memory is located on a host including the processing resource.

24. The apparatus of claim 21, further comprising a memory device coupled to the processing resource, wherein the memory is located on the memory device.

25. The apparatus of claim 21, wherein the apparatus comprises a computing system.

26. The apparatus of claim 21, wherein the processing resource comprises a controller.

27. The apparatus of claim 26, wherein the controller comprises control logic configured to decode the microcode instruction.

28. The apparatus of claim 26, wherein the controller comprises cache configured to store the microcode instruction.

29. The apparatus of claim 26, wherein the controller comprises a sequencer configured to execute the microcode instruction.

30. The apparatus of claim 21, wherein the apparatus comprises a memory device and the processing resource comprises a compute component of the memory device.

* * * * *